Patented Aug. 21, 1934

1,971,309

UNITED STATES PATENT OFFICE 1,971,309

ULTRA-VIOLET TRANSMITTING GLASS

Kitsuzo Fuwa, Tokyo, Japan, assignor to General Electric Company, a corporation of New York No Drawing. Application September 18, 1931, Serial No. 563,678. In Japan October 18, 1930

3 Claims. (Cl. 106—36.1)

My invention relates to a method of manufacturing glass and more particularly to a method of manufacturing glass which transmits ultra-violet rays.

Transmission of ultra-violet rays through glass depends upon the amount of impure iron and titanium that it contains. Such impure material is found mostly in the sands that go to make up the glass composition. The form in which the iron exists in the glass also greatly affects the ease of transmission of ultra-violet rays. In the form of ferric compounds it will absorb the ultra-violet rays more readily than in the form of ferrous compounds.

Attempts have been made to drive the iron out of the sand by acid washing or by means of a magnetic separator. However, this process is accompanied by great difficulty when the iron is in the form of a silicate.

One of the features of my invention is a much simpler way to drive out a part of the iron contained in the glass composites and to convert the remaining iron oxides into higher oxides, that is, from ferric to ferrous oxides of iron.

According to my invention, halogen compounds, such as halogen salts or double salts, particularly fluorides, are combined with iron during the melting of the glass batch. A part of the iron combines with the halogen to form halides which are extremely volatile and are carried away in the form of a vapor. The remainder of the iron is converted from ferric to ferrous oxides. The proper amount of halogen compound is an important feature of my invention.

A satisfactory mixture may be made as follows:

| | Parts |
|---|---|
| Silicic acid | 68 |
| Boric acid | 16 |
| Sodium oxide | 15 |
| Sodium fluoride | 1 |
| Potassium tartrate | 0.5 |

A glass of the above composition, of a thickness of 0.5 mm., transmits rays of a wave length of 2200 to 2300 Å, showing over eighty per cent of permeability at 3000 Å. It has also been found that a glass made by replacing a part of the boric acid with three per cent each of lime and zinc oxide will transmit, at the same thickness, wave length of 2000 to 2600 Å, showing over fifty per cent of permeability at 3000 Å. Potassium tartrate is found effective as a supplementary reducing agent.

What I claim as new and desire to secure by Letters Patent of the United States, is,—

1. The method of manufacturing glass capable of transmitting ultra-violet radiation which consists in adding a halogen compound and a small quantity of an alkalin tartrate to the glass batch.

2. A batch for making glass capable of transmitting ultra-violet rays comprising principally silicic and boric oxides and an alkaline oxide, and also comprising a small percentage of a halogen compound and an alkalin tartrate.

3. A batch for making glass capable of transmitting ultra-violet rays comprising principally silicic and boric oxides and an alkaline oxide, and also comprising a small percentage of a fluoride and an alkalin tartrate.

KITSUZO FUWA.